(No Model.)  5 Sheets—Sheet 1.
C. H. HILL.
BAND CUTTER AND FEEDER.
No. 526,351.  Patented Sept. 18, 1894.
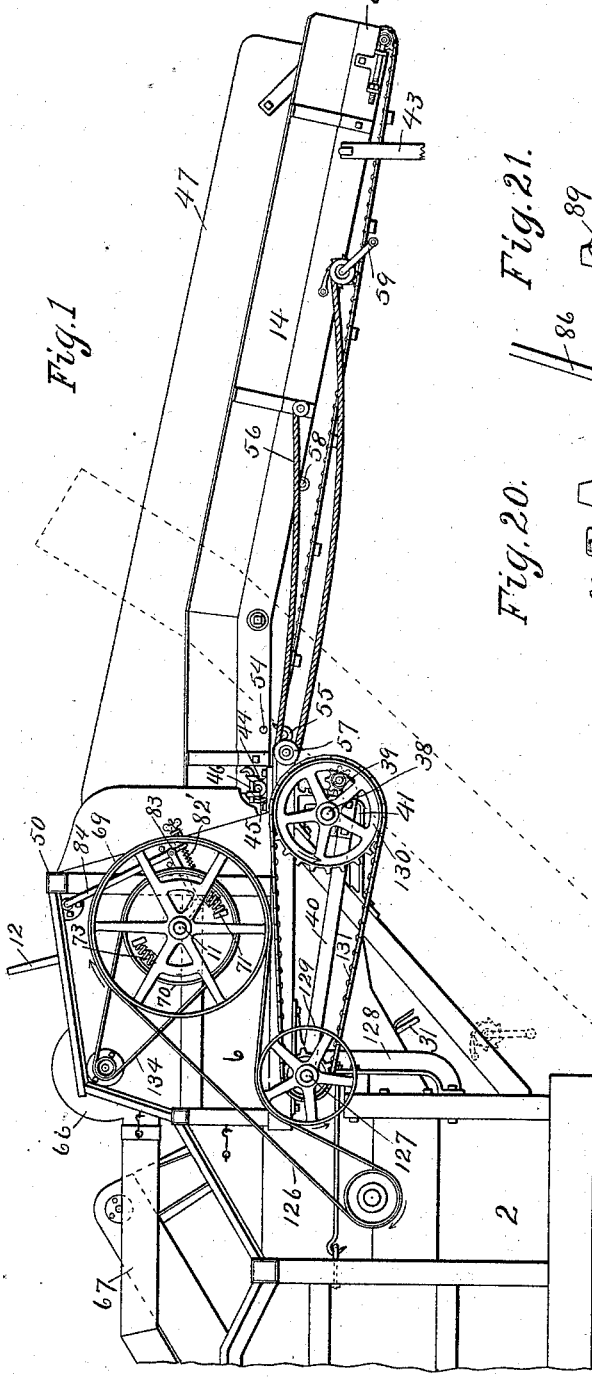
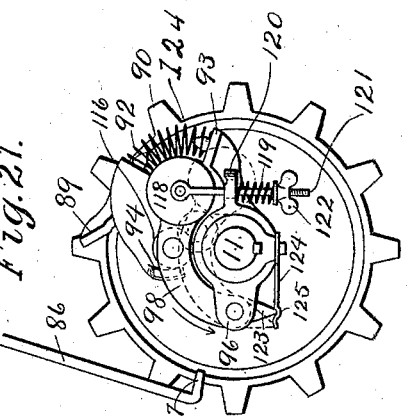
Witnesses
Inventor
Chauncy H. Hill
By Paul & Hawley
his Attorneys

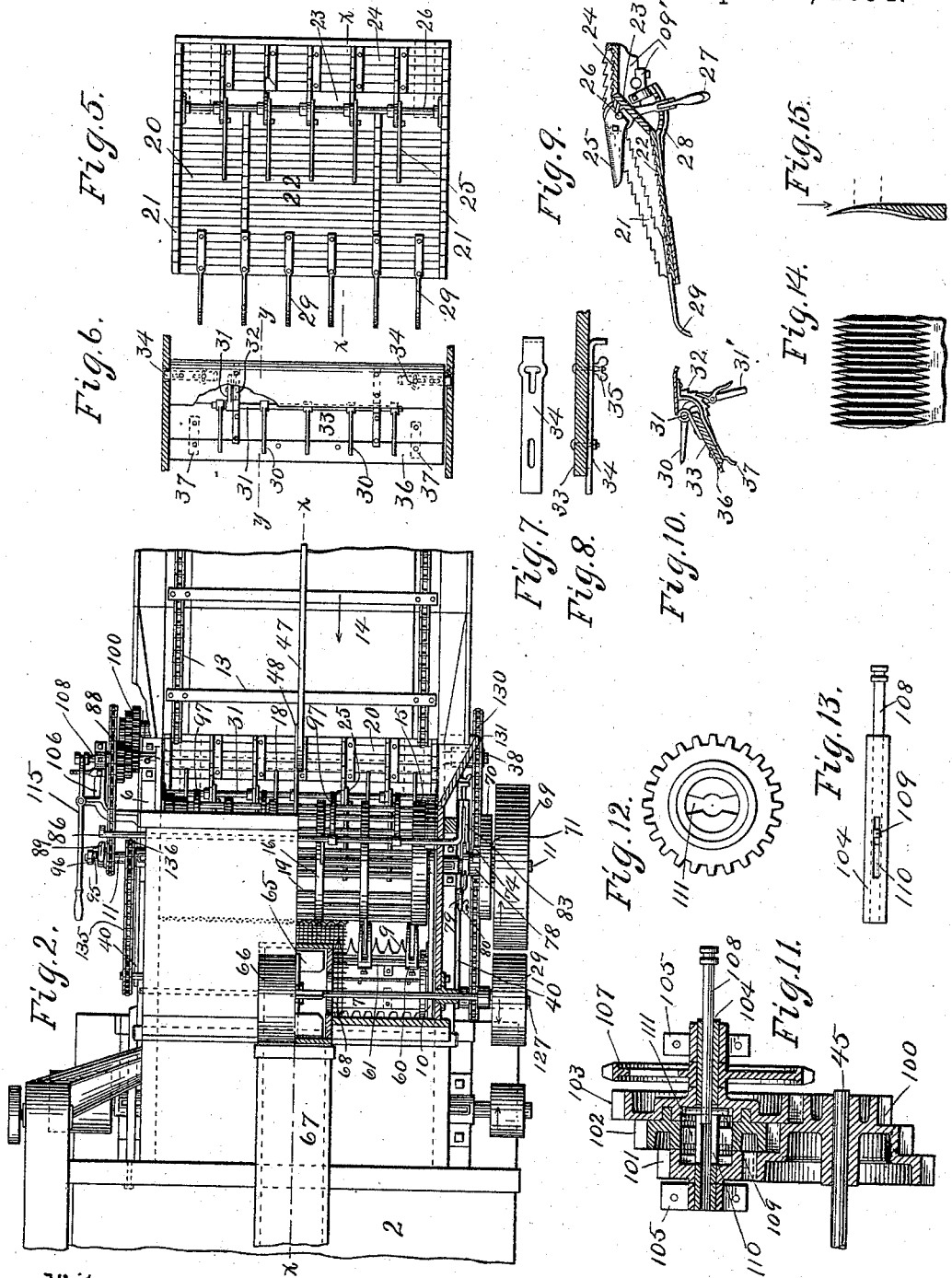

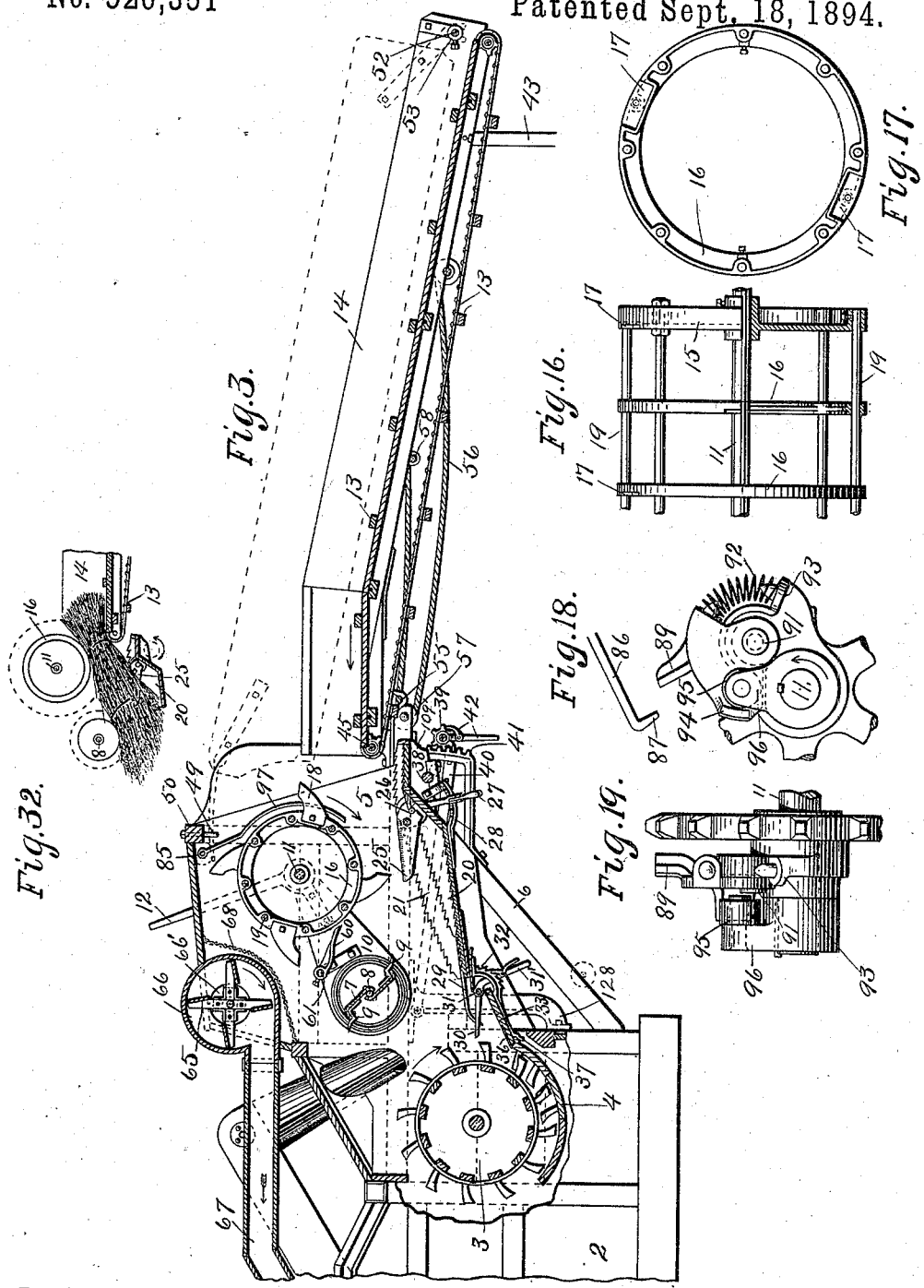

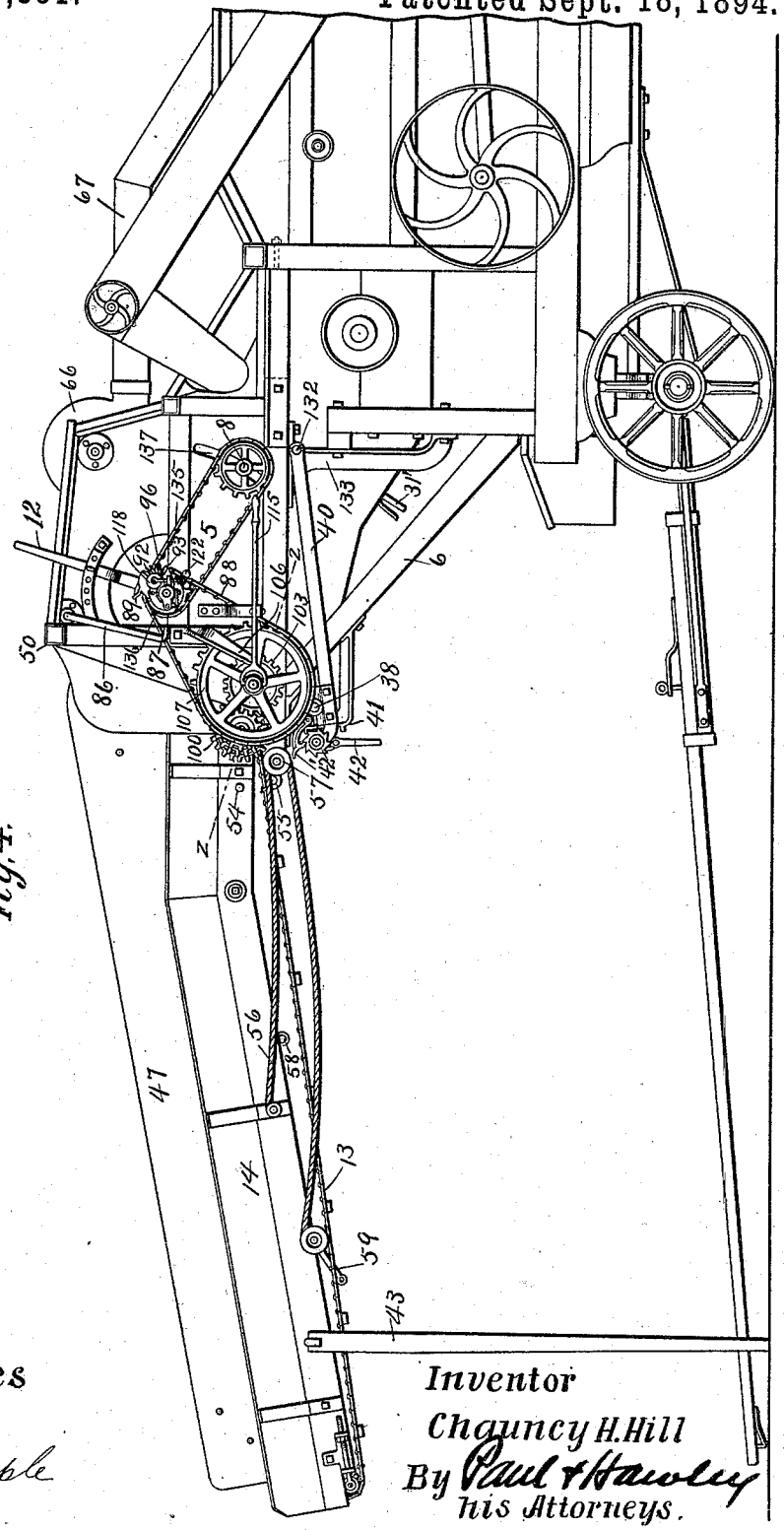

(No Model.)　　　　　　　　　　　　　　　　　　　　5 Sheets—Sheet 5.
C. H. HILL.
BAND CUTTER AND FEEDER.
No. 526,351.　　　　　　　　　　Patented Sept. 18, 1894.
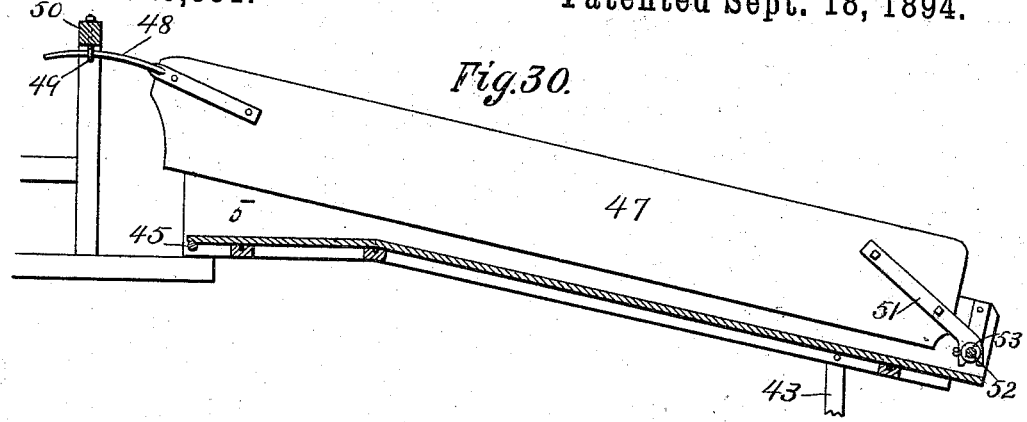
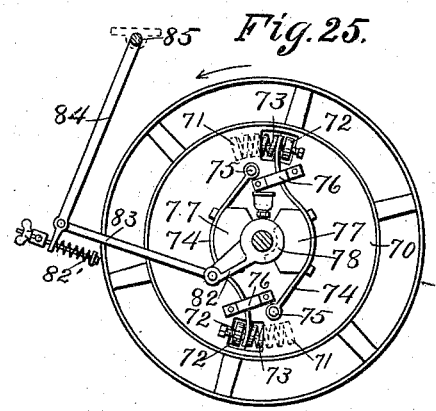
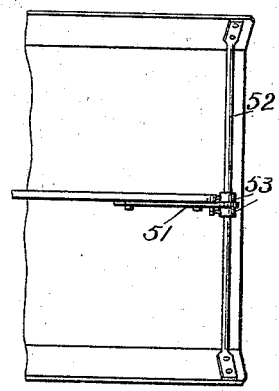
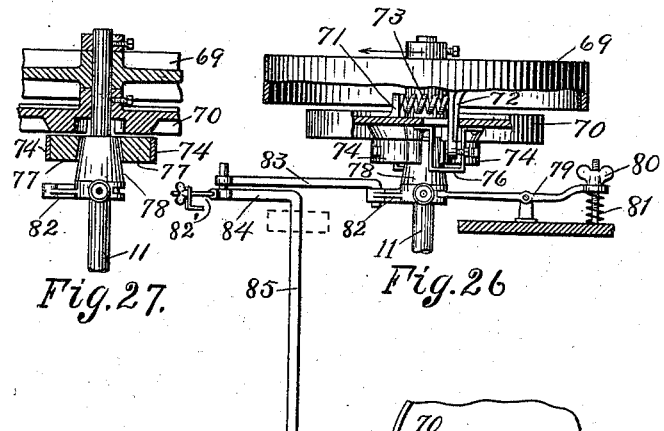
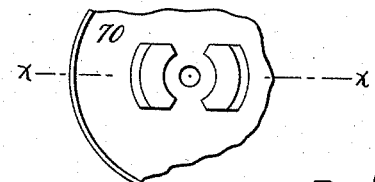
Witnesses
Inventor
Chauncy H. Hill
By Paul Hawley
his Attorneys.

UNITED STATES PATENT OFFICE.

CHAUNCY H. HILL, OF MINNEAPOLIS, MINNESOTA.

BAND-CUTTER AND FEEDER.

SPECIFICATION forming part of Letters Patent No. 526,351, dated September 18, 1894.

Application filed April 20, 1893. Serial No. 471,224. (No model.)

*To all whom it may concern:*

Be it known that I, CHAUNCY H. HILL, of the city of Minneapolis, county of Hennepin, State of Minnesota, have invented certain new and useful Improvements in Band-Cutters and Feeders, of which the following is a specification.

My invention relates to improved automatic means for cutting the bands of grain bundles and feeding the grain into the thrashing machine; and the objects which I have in view are a general cheapening of the cost of such devices, to so construct a feeder and cutter as to effectually prevent clogging of the cylinder by any kind of grain, whether wet and heavy or dry and light; to provide an automatic stop in connection with the device whereby the conveyer may be temporarily stopped immediately upon the piling up of the material therein or in the feeder; to provide means for exhausting the dust from before the cylinder and thus prevent the blinding of the pitchers; to so arrange and construct the cutting knives that instead of being blunted they will be continually sharpened; to provide a combination of rotating upper knives and agitating lower knives so arranged as to cut bands from both top and bottom of the bundles with a forced feed cut, to cut the bands from two layers of bundles one on top of the other without cutting clear through either.

A further object is to more effectually and easily handle a mixture of loose and bound grain; and further to render the use of a short rotating knife practicable, thereby saving a large percentage of the power heretofore required for effective band cutting.

A further object is to provide simple means for adjusting the depth of cut or volume of feed; to provide an adjustable comb or retarding mechanism in front of the opening between the cylinder and the outer edge of the concave of the thrasher to prevent the cylinder from snatching and wedging in tough and matted grain; further to provide ample room and convenient means for getting at the cylinder and concave of the thrasher; and further to so arrange the bundle conveyer that it may be readily swung out of the way when not in use.

To these ends my invention consists in general in the constructions and combinations hereinafter described and particularly pointed out in the claims, and will be more readily understood by reference to the accompanying drawings, forming a part of this specification, in which—

Figure 1 is a side view of a machine embodying my invention. Fig. 2 is a plan view thereof with portions cut away to more clearly show the construction. Fig. 3 is a vertical section on the line x—x of Fig. 2. Fig. 4 shows the opposite side of the machine. Fig. 5 is a plan view of the bottom board of the feeder. Fig. 6 is a plan view of the cylinder or feed board arranged beneath the end of the bottom board or tray. Figs. 7 and 8 are detailed views showing the device by means of which the feed board is held in place. Fig. 9 is a sectional view on the line x—x of Fig. 5. Fig. 10 is a sectional view on the line y—y of Fig. 6. Fig. 11 is an enlarged horizontal section on the line z—z of Fig. 4, showing the means for regulating the speed of the carrier. Figs. 12 and 13 are details taken from the device shown in Fig. 11. Figs. 14 and 15 are side and sectional views showing a portion of one cutting knife, and showing the construction thereof whereby the knives are made to wear sharp. Figs. 16 and 17 are enlarged detail views showing the side and one of the castings respectively, of the knife cylinder. Fig. 18 is an end view of the stop or releasing device by means of which the conveyer and other parts are stopped at certain times. Fig. 19 is a side view thereof. Figs. 20 and 21 are side and end views showing the same device as adapted for use when centrifugal action also is depended upon. Figs. 22, 23 and 24 are respectively plan, side and sectional views of one of the knife clearing dogs or arms arranged opposite the knife cylinder. Figs. 25 and 26 are respectively end and plan views of the regulator and stop device which I employ upon the end of the knife cylinder, a portion of the latter being shown in section to more clearly illustrate the construction thereof. Fig. 27 is a sectional detail showing the manner of mounting the driving pulley and the clutch pulley which operates therewith. Fig. 28 is a detail side view showing the bosses upon which the friction blocks of the regulator device rest. Fig. 29 is a perspective detail of the actuating rod connected with the regulator. Fig. 30 is a vertical longitudinal section of the conveyer trough showing the dividing board therein. Fig. 31 is a plan view of the rear end of the same showing the manner of securing the dividing board. Fig. 32 illustrates a changed position of the cutters and the beater with respect to the inner end of the conveyer and the lower knives.

As shown in the drawings, 2 represents the body of the thrashing machine, 3 the cylinder and 4 the concave, all of the usual form. The automatic feeder-box 5 is supported upon the frame 6, which may be permanently secured upon the end of the separator or may be made removable therefrom, as indicated in Fig. 1. Above and in front of the cylinder, I arrange the beater consisting of the metal wings 7 secured upon the shaft 8 and provided with the separable toothed metal plates 9, which strike into and spread the straw as it passes beneath, and throws the top of the bundle first into the cylinder. The beater shaft may be fixed permanently in the sides of the box; but I prefer to mount the same upon the arms or sideboards 10, the upper ends of which are journaled upon the bearings of or about the shaft 11, and both of which may be moved up or down by means of the hand lever 12, to raise or lower the beater as rendered necessary by the character of the grain which is being thrashed. Slots 137 are arranged in the sides of the box to allow movement of the shaft. Means are provided for locking the hand-lever 12, as shown in Fig. 4. In advance of the beater, and somewhat above the same and secured upon the shaft 11, I arrange the rotating cutter device adapted to cut the bands of the bundles which are carried thereto by the long conveyer 13 arranged in the conveyer trough 14. The rotating cutter is made up of two end disks 15 secured upon the shaft, and a series of cast-iron rings 16, each being provided with one or more of the sockets or seats 17 adapted to receive the squared ends of the curved cutter knives 18. Parallel rods 19 extending through the several rings and through the end disks are locked therein by set screws and secure all of the parts rigidly together upon the shaft. The knives are sharpened upon their curved edges, and the under side of the cutter revolves toward the cylinder to at once cut the bands and urge the material forward toward that part.

To prevent the straw from winding upon the rotating cutter device, I arrange back of the cutter a series of bifurcated cleaning fingers 60, shown in detail in Figs. 22, 23, and 24, and between which the respective cutters are adapted to pass and to be cleaned thereby. The straw so taken from the cutters is caught by the beater and thrown down and toward the cylinder. These cleaning fingers are preferably made adjustable upon the cross rod 61, the ends of which are secured upon the side boards 10 belonging to the beater. The bottom of the feeder box is made up of several independent parts, all of which are preferably so arranged as to be vertically adjustable while the machine is in motion to adapt the same for use with different kinds of grain, though said parts may be immovably secured with respect to a bodily movement thereof. The main part of the bottom consists in a vertically and longitudinally reciprocating pan or pans 20, which have a serrated bottom 22, also provided with several of the toothed fishbacks or vertical plates 21. An inclining board or portion 23 extends between the upraised part 24 of the floor and the lower part 22, and within the space so made I arrange the lower cutting knives 25. The construction of these knives is shown in Figs. 14 and 15, where it will be seen that one side of each knife is provided with the long serrations or teeth, the grooves being carried into the side of the knife-blade and then the edge of the knife bent over, as shown in Fig. 15, with the result that the wear is taken up on the smooth side of the knife blade so that the edges of the teeth are at all times kept sharp and the points entirely protected from the constant wear. The knives upon the revolving cutter may, if desired, be formed in the same manner, although the necessity for the use of this exact form of knife upon the revolving cutter is not as great as that for self sharpening knives in the bottom of the box. These lower knives 25 are secured upon the rock shaft 26 and adapted to be raised or lowered by means of the hand lever 27, which is itself adapted to be locked upon the quadrant 28. The lower end of the floor has a number of downwardly curved teeth or tamping rods 29. Between these are a number of retarding fingers 30 secured upon the cross rod 31 and adapted to be adjusted in any desired position by means of the hand lever 31′ locked upon the ratchet quadrant 32. These parts constituting an automatic comb are arranged upon the inclined feed board 33, which is removably fastened in place by means of the bars 34, slipping on screw heads in the bottom of the board and fastened by thumb nuts 35, the lower end of the board being supported by the plate or strap 36 extending along its upward end and resting upon the top of the concave and prevented from lifting thereon by the lower fingers 37.

When it is desired to feed the material more slowly into the cylinder, the reciprocating bottom, which is pivoted upon the crank shaft 38, may be moved upward by means of the pinion or pinions 39 arranged upon the pivoted frame 40 whereon the crank shaft bearings rest. These pinions mesh with the fixed quadrants 41 and are moved by means of the ratchet pawl and handle 42. The conveyer trough and the conveyer therein are supported at the outer end upon pins or legs 43, and at the inner end by the socket bearings 44 in which the ends of the upper shaft 45 of the conveyer rest and are secured by crosspins 46. The trough is of sufficient width to admit two rows of bundles; and to separate the bundles and compel them to fall straight into the trough, I employ the middle or dividing board 47 having at its end a projecting rod 48 extending through the depending eye 49 on the cross-tie 50 of the feeder. The rear end has a depending bar 51 which is slotted, and is adapted to embrace the cross rod 52 of the trough and to be secured firmly thereon by two shoulders or collars 53 between which it rests.

The inclination of the trough may be changed by means of the legs 43, the trough swinging upon the shaft 45, and the trough may be swung out of the way when not in use by simply removing the pins 46 and lowering the end, whereupon the trough will swing upon the stud pins 54 projecting from the side of the trough, and will then drop into the hooks 55 on the feeder frame. By then winding up the raising rope or ropes 56, which pass over the pulley or pulleys 57 on the frame, the trough may be lifted until the cross rod pins 58 are in position to drop into the hooks, after which the crank 59 of the winding drum may be loosened and the ropes slackened so that the feeder-trough will hang entirely from the hooks. Any means may be employed for preventing its swinging when in the position of the dotted lines in Fig. 1. If desired the winding drum may be arranged upon the feeder frame. See dotted lines lower part of Fig. 1.

One of the great annoyances in feeding grain to the cylinder is due to the dust arising therefrom, which is blown out into the face of the person doing the feeding, or of those who are pitching the material upon the carrier, in case an automatic feeder is employed. This dust further obscures the parts of the machine from view, and in order to do away with the dust I provide a revolving fan 65, the case 66 of which is connected with the cylinder or feeder cap closed above the revolving parts therein, so that the fan being revolved rapidly the dust will be drawn from before the cylinder through the opening 66' into the fan box, and from within the fan box will be discharged through the pipe 67 into the interior of the separator. To prevent straw from being carried into the fan I preferably provide a wire sieve 68 across the upper part of the box and surrounding the openings into the fan, whereby the straw will be intercepted and after collecting in sufficiently large quantities will fall back into the lower part of the feeder. I regard this as a most important feature of my invention.

My machine as so far described might be adapted for and employed in a given kind of work, all of the grain being light and dry, or the machine may be adjusted to feed heavy material; but in order to render the machine capable of use with any and all kinds or qualities of grain during the same period of use, I find it necessary to employ means whereby the supply of either the loose or bound grain to the cutters may be regulated, to the end that any choking or clogging of the revolving cutter device will be immediately followed by a slowing down of the speed of, or a complete stoppage of the carrier 13, whereby time is given in which the cutter may free itself and the bunch of material beneath the same gradually and properly feed into the cylinder. This regulation need only affect the revolving cutter and the conveyer, when for this purpose I arrange the driving pulley 69 loosely upon the shaft 11 of the revolving cutter-device. The shaft and this pulley are, however, flexible or yieldingly connected by means of the second disk or pulley 70 secured upon the shaft as shown in Fig. 27, and carrying lugs 71, while the pulley 69 is provided with a lug or lugs 72, and cushioned springs 73 are arranged between these opposite pairs of lugs upon the two pulleys. The clogging of the cutters by too large a mass of material beneath them will result in the slowing down of the speed of the disk 70 and a consequent compression of the springs 73 between the same and the constantly driven pulley 69. Taking advantage of this movement I extend the lug 72 to engage the ends of flat springs or bars 74, having their opposite ends pivoted at points 75 to the disk 70, and having their upper ends preferably held in place by loops or straps 76. Upon these straps I arrange friction blocks 77 which, when the springs are forced inwardly are pressed firmly against the cone friction pulley 78 journaled upon the shaft 11. This cone may be adjusted longitudinally on the shaft by means of the yoke lever 79 and the thumb-nut and screw 80 and 81, thereby causing the device to act with greater or less promptness. When the blocks 77 are thus forced upon the cone 78 the tendency is to revolve the same and to carry with it the arm 82 extending therefrom. This arm, however, is normally held in position by the spring 82' and the link 83 extending from the crank 84 upon the cross-shaft 85, upon the opposite end of which is a second crank-arm 86 provided with a hook 87. The rock-shaft 85 is journaled in suitable boxes provided in the top of the feeder casing and is rocked when the cone and its arm 82 are partially revolved by the slipping action of the rapidly rotating friction blocks 77. Upon the opposite end of the revolving cutter shaft 11 I provide a clutch device, provided with the sprocket pulley from which the belt 88 passes to a connection with the shaft 46 of the conveyer, whereby the conveyer is driven as the cutter device revolves. When the rocking shaft is moved, however, the hook 87 thereof is moved into the path of a hook 89 provided upon the clutch device and engaging the same disengages the small sprocket wheel from the shaft 11, thereby disconnecting and stopping the conveyer 13. The construction of this clutch device may be varied somewhat, but I prefer that shown in Figs. 18 and 19 or the modification thereof shown in Figs. 20 and 21. As shown therein, 90 represents the small sprocket wheel spoken of which is journaled upon the shaft 11 and carries the lug 89 which is pivoted thereon by a short screw or stud 91 but is normally held in position by a spring 92 extending between the heel of the lug 89 and the shoulder 93 provided upon a boss or hub of the wheel 90. Upon the pivoted lug casting is a second lug 94 normally engaging the small friction roller 95 provided in the arm 96 which is keyed upon the shaft 11. The engagement of the hook 87 therefore is caused by overloading the cutters, and results in the engagement with and holding back of the lug 89, which being held stationary tilts and withdraws the lug 94 from engagement with the arm, whereupon the shaft 11 will continue to revolve independent of the wheel 90 until the cutter having sufficiently freed itself from the clogging tendency or force, the parts shown in Figs. 26 and 27 will return to their normal positions and the shaft 85 will be rocked back to withdraw the hook 87, when the lug 89 will be driven by the spring 92 to its former position resulting in a positive start of the conveyer 13.

As a further means of stopping the conveyer I provide a series of depending arms 97 upon the middle portion of the crank shaft 85, the same extending down across the face of the revolving cutter and between the knives thereof and normally standing some distance from the periphery of the device, where they are held by the resistance spring 82' the tension of which may be adjusted by the rod and thumb-nut connected therewith. Immediately upon the piling up of the material before the cutters these arms 97 will be pressed back and thereby rock the shaft 85 to move its crank arm and carry the hook 87 into the path of the clutch lug, thus causing the stoppage of the conveyer.

In Figs. 20 and 21 I have shown a modified construction of the clutch or chuck, in Figs. 18 and 19 amplifying the principle of a simple clutch to include that of centrifugal action so that the fall in the speed of the cutter will result in throwing out the conveyer, the object of the same being to permit the cylinder to raise to full speed before any material is carried into the feeder box by the conveyer, and also to stop the action of the conveyer before the thrashing machine ceases to move, thereby preventing grain being carried into the cylinder when the same is running at a speed below the safe working limit.

In order that the speed of the conveyer may be further adjusted to obtain the best results with different kinds of grain, I provide a series of gear wheels between the sprocket which drives the shaft of the conveyer and the shaft itself. These gears are shown plainly in Figs. 2, 11, 12, and 13, where it will be seen that a gear cone 100 is arranged upon the end of the conveyer shaft 45, the gear wheels thereon being of two or more sizes. Meshing with these gear wheels are three independently revoluble gear wheels 101, 102, and 103, all journaled upon a short shaft 104 supported in bearing boxes 105 arranged upon the frame 6 and the bracket 106. The sprocket wheel 107 over which the belt 88 passes is secured to this short shaft, and to fasten any one of the three independent gears to the shaft I provide the plunger 108 extending through the hollow shaft 104 and having in its end a cross pin 109 adapted to operate in slots 110 provided in the shaft. This pin is adapted to enter the slots 111 provided in the several loose gears, and to lock the pin within any one of them or in the annular grooves situated between the walls of the transverse slots, I provide the adjustable and locking lever 115, shown plainly in Fig. 2.

The small friction roller 116 (Figs. 20 and 21), corresponds to the roller 95 of Fig. 18, but instead of being rigidly secured with respect to the shaft 11, the roller is mounted in the short curved lever 98 pivoted upon the arm 96 locked upon the shaft 11. The outer end of the curved arm is provided with a weight 118, and the arm is normally held close down to the shaft by means of the spring 119 acting against the lug 120 projecting from the arm casting 96. This spring is preferably held in place by the rod 121 pivoted upon the weight 118 and the tension of the spring may be adjusted by means of the thumb-nut 122. The heel 123 of the curved lever is adapted to rest upon the strong spring 124, also fastened upon the part 96 and provided with a groove or seat 125 adapted to receive the sharp end of the heel when the lever is forced out by centrifugal force. The tension of the spring 119 is such that this arm will not be forced out until the cylinder rises to the fixed speed. At such time the small roller 116 will be passed into engagement with the then stationary lug 94, to lock the same and the sprocket wheel 90 upon the shaft 11. After arriving at this position the arm will only be lowered by a great fall in the speed of the cylinder which drives the cutter shaft, as the arm is quite firmly locked by the spring 124. In either respect the clutch of Figs. 20 and 21, is the same as that shown in Figs. 18 and 19. The exact positions of the revolving cutter and the revolving beater within the box may be altered to a considerable extent without materially affecting the operation of the machine. Such an alteration I have shown in Fig. 32, where the said parts are shown as moved outwardly and operating nearer to the end of the long conveyer 13.

I prefer to drive my band cutter and feeder by a belt 126 passing over a pulley rigidly mounted on the cylinder shaft of the thrasher as shown. In order to avoid using a crossed belt for imparting motion to the feeder bottom, I provide a stud shaft 127 rigidly secured to the casting 128 upon which is loosely mounted a two-step pulley 129, the smaller of which drives the belt passing over the pulley 130 which is rigidly mounted on the crank shaft 38, on which the feeder bottom or vibrating and oscillating pan has its outer bearings 109'. The iron frame 40 on which this crank shaft has its bearings in order to permit of a vertical adjustment at its crank shaft end, and in order that the belt 131 driving said crank shaft may retain the same tension at all points of vertical adjustment along the quadrant 41, said frame 40 is pivoted on the stud shaft 127 on which the driving pulley of the belt 131 is mounted, the other side of the frame being pivoted at a point immediately opposite on the lug 132 of the casting 133, as may be seen in Fig. 4. The disk 70 of the regulator has a pulley face over which the belt 134 passes to drive the fan. The beater shaft 8 is driven by the belt 135 which passes over the wheel 136 which is rigidly secured to the cutter shaft 11. The adjustable beater frame 10 is pivoted on the bearings of the cutter shaft 11 that the distance between the driving and driven shafts of the belt 135 may at all times remain the same and the belt retain the same tension at all times irrespective of the angle of adjustment of the beater.

Having thus described my invention, I claim as new and desire to secure by Letters Patent—

1. The combination, in an automatic feeder, of the feeder frame, with the reciprocating bottom therefor, the frame whereon said bottom is hung, the crank shaft having bearings upon said frame and actuating said bottom, a stationary quadrant 41, and a quadrant or gear fixed upon the adjustable frame 40 and meshing with the stationary quadrant and whereby said quadrant may be vertically adjusted, substantially as described.

2. The knife for automatic band cutters and feeders, having one side grooved and the edge of the knife being turned or curved, whereby as the knife is worn it is continually sharpened, substantially as described.

3. The combination, in an automatic feeder, of a reciprocating bottom therefor, with downwardly curved tamping fingers 29 projecting from the inner end of said bottom, and the adjustably pivoted retaining fingers 30 arranged between said curved fingers, whereby the passage of the grain into the thrashing machine cylinder is regulated, substantially as described.

4. The combination, with the thrashing machine, of the automatic feeder having the inclined bottom, the removable feed board 33, brackets thereon, a cross rod or shaft journaled in said brackets, retaining fingers 30 secured upon said shaft, means arranged upon the feed board for adjusting said fingers, the sliding locks 34 arranged upon the feed board, the feeder frame wherein the ends of said locks are supported, and means for supporting the inner and lower ends of the feed boards, substantially as described.

5. The combination, in an automatic feeder, of the frame or box, with the bottom therefor, and a rotating cutter device, consisting of a shaft 11, end disks 15 secured thereon, rings 16, the connecting and supporting rods 19, said rings and disks being provided with seats or sockets 17, and curved cutting knives secured in said sockets, substantially as described.

6. The combination, in an automatic feeder and band cutter, of a frame or box, the inclined bottom therefor, the shaft 11, the open cylinder mounted thereon, the knives 18 carried by said cylinder, the rotating beater arranged back of the knife cylinder, the side supports 10 for said beater, said parts being journaled about the shaft 11, means for adjusting said beater, and the bifurcated clearing fingers adapted to move with said beater frame and arranged between the beater and the knife cylinder and adapted to clear the knives thereof, substantially as described.

7. The combination, in an automatic feeder for thrashing machines, of a driven shaft, a conveyer and the shaft thereof, said driven shaft provided with an arm 96, a pulley journaled upon said shaft and provided with a lug, a belt extending from said pulley to a like connection with said conveyer shaft, the weighted arm 98 pivoted in said arm 96, a spring for resisting the movement thereof, said arm provided with a projection adapted to engage said lug when the arm is moved out by centrifugal action, and a determined retaining device for said arm, adapted to hold said arm outward at normal speeds but insufficient to prevent the disconnection with said lug when the speed falls below a certain limit, substantially as described.

8. The combination, in an automatic feeder, of a shaft arranged to be driven from the cylinder shaft, depending fingers arranged across the opening into the feeder box, a rock shaft whereon said fingers are secured, said rock shaft provided with a crank arm having a hook, a clutch device provided upon said driven shaft and having a lug with which said crank arm is adapted to engage, the conveyer, and the shaft, and a connection between the loose part of said clutch provided with said lug and said conveyer shaft, whereby upon pressing back said depending fingers the conveyer is stopped, substantially as described.

9. The combination, with the cylinder, of a shaft driven therefrom, a two part clutch device arranged upon said shaft, one of said parts being journaled thereon and provided with the spring lug adapted to engage the fixed part, a conveyer, a connection between the loose parts of the clutch and said conveyer whereby the same is driven, the yielding fingers extending across the opening between said conveyer and the cylinder, and a crank arm connected with said fingers and adapted to be moved into engagement with said spring lug to disengage the loose part of said clutch when said fingers are pressed back, substantially as described.

10. The combination, with the cylinder and the feed box and floor, of a revolving cutter and the shaft thereof, the conveyer and its shaft, a connection between said shafts, a clutch interposed in said connection and consisting in a stop carried upon the cutter shaft, a spring lug device journaled upon the shaft and having a lug 94 adapted to engage the stop upon the said shaft, a lug 89 also provided thereon, the driving pulley also journaled upon said cutter shaft, a fixed part upon said shaft, a yielding connection between said part and said driving pulley, a crank shaft provided with a hooked arm 86 adapted to engage the lug 89, and said shaft being adapted to be operated upon the compression of said yielding part to properly throw out said conveyer, substantially as described.

11. The combination, with the cylinder, of the rotating band cutter, the shaft thereof, the drive pulley yieldingly mounted on said shaft, the clutch device provided upon the opposite end of the shaft, and consisting of an arm 96 fixed upon the end of the shaft, a short lever pivoted in said arm and provided with a stop or roller 116, a spring 119 against which said arm acts, said lever provided with a hook or heel 123 a spring 125 carried upon the arm 96 and adapted to engage said heel, the pulley 90 journaled upon the shaft and carrying the spring lug device having a lug 89, and a lug 94 adapted to engage said stop or roller 116, a crank shaft the end of which is adapted to be moved into engagement with the lug 89 to withdraw the lug 94 from said roller, and said crank shaft arranged to be moved by the yielding of said drive pulley upon its shaft when the rotating cutter is clogged, and the conveyer arranged to be operated from said wheel 90, subtantially as described.

12. The combination, with the revolving cutter, of the drive pulley loosely mounted thereon and having one or more lugs 72, the disk 70 fixed upon said shaft and having a lug or lugs 71, a spring arranged between the lugs 71 and 72, the spring or springs 74 secured upon said disk and extending into engagement with said lug or lugs 72, the friction block 77 upon the spring 74, the friction cone or sleeve 78 journaled upon said shaft and adapted to be engaged by said block when said spring is compressed, said sleeve 78 having an arm, a conveyer, means for driving said conveyer from said cutter shaft, a clutch arranged upon the cutter shaft for disengaging the same from said conveyer, and a connection between said cone and said clutch whereby the same is disengaged when said spring 74 is compressed, substantially as described.

13. The combination, with the shaft 11, of the pulley 69 loosely mounted thereon, the disk 70 fixed on said shaft, the lugs 72 and 71 arranged upon said pulley and disk respectively, springs arranged between said lugs, the spring 74 carried upon said disks and having their ends in engagement with said lugs 72, the friction blocks 77, the friction cone 78 journaled upon the shaft 11, the yoke lever 79 for adjusting said cone, the conveyer, means for driving the same, and means for stopping said conveyer when said cone is clutched by said friction blocks 77, substantially as described.

14. The combination, with the thrashing machine, of the feeder box arranged thereon, the conveyer trough, the conveyer therein, means for driving the same, the hooks 55 provided upon the frame of the feeder, pins 54 and 58 arranged upon said trough, the pulleys 57, the winding shaft provided upon said trough, the crank thereon, the ratchet wheel and pawl for securing said shaft, and the rope or ropes 56 attached to said trough and to said winding shaft, and passing over said pulleys 57, whereby said trough may be raised and swung upon the pins 58 resting in said hooks 55, substantially as described.

15. The combination, in an automatic feeder, of the feeder box, with the reciprocating bottom therefor having the depressed portion, the adjustable knives 25 arranged on the bottom and extending above the depressed portion, and means for adjusting said knives, substantially as described.

In testimony whereof I have hereunto set my hand this 10th day of April, 1893.

CHAUNCY H. HILL.

In presence of—
C. G. HAWLEY,
M. E. GOOLEY.